(12) United States Patent
Klaib et al.

(10) Patent No.: US 12,559,258 B2
(45) Date of Patent: Feb. 24, 2026

(54) FREEPLAY MEASUREMENT TOOL AND ASSOCIATED SYSTEM AND METHOD

(71) Applicant: The Boeing Company, Arlington, VA (US)

(72) Inventors: Anthony Klaib, Corona, CA (US); Arpad E. Balogh, Jr., Lakewood, CA (US)

(73) Assignee: The Boeing Company, Arlington, VA (US)

( * ) Notice: Subject to any disclaimer, the term of this patent is extended or adjusted under 35 U.S.C. 154(b) by 377 days.

(21) Appl. No.: 18/304,216

(22) Filed: Apr. 20, 2023

(65) Prior Publication Data

US 2024/0351708 A1        Oct. 24, 2024

(51) Int. Cl.
B64F 5/60        (2017.01)
G01B 5/00        (2006.01)
G01B 5/14        (2006.01)

(52) U.S. Cl.
CPC .............. B64F 5/60 (2017.01); G01B 5/0025 (2013.01); G01B 5/14 (2013.01)

(58) Field of Classification Search
CPC ............ B64F 5/60; G01B 5/0025; G01B 5/14
See application file for complete search history.

(56) References Cited

U.S. PATENT DOCUMENTS

2016/0041050 A1*  2/2016  Vera ........................ G01B 21/16
                                                            73/788

* cited by examiner

*Primary Examiner* — Timothy P Graves
(74) *Attorney, Agent, or Firm* — Kunzler Bean & Adamson

(57)        ABSTRACT

A freeplay measurement tool is disclosed. The freeplay measurement tool comprises a first measuring device configured to be removably coupled to a first structure and a second measuring device configured to be removably coupled to a second structure. The first structure and the second structure are connected via a joint. The freeplay measurement tool also comprises at least one load cell and a loading sling. The loading sling comprises a spreader bar, a first retention member, fixed to a forward end of the spreader bar and the load cell, a second retention member, fixed to an aft end of the spreader bar and the load cell, and at least one loading pad coupled to and extending from the spreader bar. When the first measuring device and the second measuring device are coupled to the first structure and the second structure, respectively, the spreader bar is positionable adjacent to a loading surface of the second structure so that the at least one loading pad applies a predetermined external load only to the loading surface of the second structure.

20 Claims, 9 Drawing Sheets

FREEPLAY MEASUREMENT TOOL AND ASSOCIATED SYSTEM AND METHOD

FIELD

This disclosure relates generally to a freeplay measurement tool, and more particularly to a measurement tool for measuring freeplay in a joint between two structures and associated systems and methods.

BACKGROUND

Freeplay refers to the variation in position or rotation between two connected mechanical parts (i.e., movable), such as two structures connected by a joint. It is often desirable to measure freeplay to ensure that the movable parts are functioning properly. Aircraft are equipped with many movable parts, including control surfaces for directional control during flight and, in some cases, folding wingtips. It is important to measure freeplay of these movable parts to ensure optimal performance of the aircraft. Excessive freeplay between movable parts can cause vibrations, fatigue, damage, or other instabilities. Conventional freeplay testing methods involve using ground-supported tools, like jack stands, to directly apply a load to a movable part during testing. However, some movable parts can be difficult to reach from the ground. Moreover, ground-supported tools are ineffective for some movable parts, such as parts with non-linear surfaces, and are inadequate for testing that requires large amounts of load. Furthermore, conventional freeplay testing methods typically uses dial indicators which require testing at multiple testing locations, each testing location generating a linear distance that must be analyzed and then converting all the data into a singular angular measurement, leading to a time-consuming, labor-intensive, and expensive process.

SUMMARY

The subject matter of the present application has been developed in response to the present state of the art, and in particular, in response to the problems of and needs created or not yet fully solved by conventional measurement apparatuses and methods. Generally, the subject matter of present application has been developed to provide a freeplay measurement tool, and associated systems and methods, that overcome at least some of the above-discussed shortcomings of prior art techniques.

Disclosed herein is a freeplay measurement tool. The freeplay measurement tool includes a first measuring device configured to be removably coupled to a first structure and a second measuring device configured to be removably coupled to a second structure. The first structure and the second structure are connected via a joint, defining a joint axis, and the second structure is selectively movable, relative to the first structure, about the joint axis. The freeplay measurement tool also includes at least one load cell. The freeplay measurement tool further includes a loading sling. The loading sling includes a spreader bar including a forward end and an aft end. The forward end is spaced apart from the aft end by a bar length. At least one loading pad is coupled to and extends from the spreader bar at a loading position along the bar length. A first retention member includes a first upper end and a first lower end, the first upper end is removably attachable to the at least one load cell and the first lower end is fixed to the forward end of the spreader bar. A second retention member includes a second upper end and a second lower end, the second upper end is removably attachable to the at least one load cell and the second lower end is fixed to the aft end of the spreader bar. When the first measuring device and the second measuring device are coupled to the first structure and the second structure, respectively, the spreader bar is positionable adjacent to a loading surface of the second structure so that the at least one loading pad applies a predetermined external load only to the loading surface of the second structure. The preceding subject matter of this paragraph characterizes example 1 of the present disclosure.

The first measuring device and the second measuring device are inclinometers configured to cooperatively measure a differential angular deflection between the first structure and the second structure. The preceding subject matter of this paragraph characterizes example 2 of the present disclosure, wherein example 2 also includes the subject matter according to example 1, above.

The first structure is a fixed wing root of a wing of an aircraft and the second structure is a folding wing tip of the wing of the aircraft. The preceding subject matter of this paragraph characterizes example 3 of the present disclosure, wherein example 3 also includes the subject matter according to any of examples 1-2, above.

The freeplay measurement tool includes a loading device configured to be removably attachable to the at least one load cell. The loading device is configured to move the loading sling in a load direction, perpendicular to the spreader bar of the loading sling. The preceding subject matter of this paragraph characterizes example 4 of the present disclosure, wherein example 4 also includes the subject matter according to any of examples 1-3, above.

The loading device is a chain hoist. The preceding subject matter of this paragraph characterizes example 5 of the present disclosure, wherein example 5 also includes the subject matter according to example 4, above.

At least one of a height, an angle, or the loading position of the at least one loading pad, relative to the spreader bar, is adjustable. The preceding subject matter of this paragraph characterizes example 6 of the present disclosure, wherein example 6 also includes the subject matter according to any of examples 1-5, above.

The loading sling includes a plurality of loading pads, the at least one loading pad being at least one of the plurality of loading pads. The preceding subject matter of this paragraph characterizes example 7 of the present disclosure, wherein example 7 also includes the subject matter according to any of examples 1-6, above.

The plurality of loading pads comprises a first loading pad and a second loading pad. The spreader bar is positionable adjacent to the loading surface of the second structure so that the first loading pad and the second loading pad apply the predetermined external load only to the loading surface of the second structure. The predetermined external load is applied to the second structure by the first loading pad and the second loading pad. The preceding subject matter of this paragraph characterizes example 8 of the present disclosure, wherein example 8 also includes the subject matter according to example 7, above.

The freeplay measurement tool includes a plurality of load cells. The at least one load cell comprises at least one of the plurality of load cells. The preceding subject matter of this paragraph characterizes example 9 of the present disclosure, wherein example 9 also includes the subject matter according to any of examples 1-8, above.

The spreader bar includes a first extension arm at the forward end, the first extension arm being perpendicular to the bar length of the spreader bar. The first lower end of the first retention member is fixed to the first extension arm. The spreader bar also includes a second extension arm at the aft end, the second extension arm being perpendicular to the bar length of the spreader bar. The second lower end of the second retention member is fixed to the second extension arm. The preceding subject matter of this paragraph characterizes example 10 of the present disclosure, wherein example 10 also includes the subject matter according to any of examples 1-9, above.

The loading sling includes guide poles coupled to and extending from the spreader bar at locations between the forward end and the aft end of the spreader bar. The guide poles are adjacent to a side edge of the second structure when the spreader bar is positioned adjacent to the loading surface of the second structure so that the at least one loading pad applies the predetermined external load only to the loading surface of the second structure. The preceding subject matter of this paragraph characterizes example 11 of the present disclosure, wherein example 11 also includes the subject matter according to any of examples 1-10, above.

The loading surface of the second structure had a surface length. The bar length of the spreader bar is greater than the surface length of the loading surface. The preceding subject matter of this paragraph characterizes example 12 of the present disclosure, wherein example 12 also includes the subject matter according to any of examples 1-11, above.

The joint axis has only degree of freedom, such that the second structure is selectively rotatable, relative to the first structure, about the joint axis. The preceding subject matter of this paragraph characterizes example 13 of the present disclosure, wherein example 13 also includes the subject matter according to any of examples 1-12, above.

The at least one loading pad is configured to contact a contact location on the second structure. The contact location has sufficient structural support to withstand the predetermined external load. The preceding subject matter of this paragraph characterizes example 14 of the present disclosure, wherein example 14 also includes the subject matter according to any of examples 1-13, above.

The predetermined external load is at least 1200 lbs. The loading device is configured to move the loading sling in the load direction, perpendicular to the spreader bar of the loading sling until the predetermined external load is applied to the second structure. The preceding subject matter of this paragraph characterizes example 15 of the present disclosure, wherein example 15 also includes the subject matter according to example 4, above.

An aperture is defined by the loading sling. The second structure is configured to pass through the aperture when the spreader bar of the loading sling is positioned adjacent to the loading surface of the second structure. The preceding subject matter of this paragraph characterizes example 16 of the present disclosure, wherein example 16 also includes the subject matter according to any of examples 1-15, above.

Further disclosed herein is a freeplay measurement system. The system includes a first measuring device configured to be removably coupled to a first structure and a second measuring device configured to be removably coupled to a second structure. The first structure and the second structure are connected via a joint, defining a joint axis, and the second structure is selectively movable, relative to the first structure, about the joint axis. The system also includes at least one load cell and a loading sling. The loading sling includes a spreader bar including a forward end and an aft end. The forward end is spaced apart from the aft end by a bar length. The loading sling also includes at least one loading pad coupled to and extending from the spreader bar at a loading position along the bar length. The loading sling further includes a first retention member including a first upper end and a first lower end. The first upper end is removably attachable to the at least one load cell and the first lower end is fixed to the forward end of the spreader bar. The loading sling also includes a second retention member including a second upper end and a second lower end. The second upper end is removably attachable to the at least one load cell and the second lower end is fixed to the aft end of the spreader bar. The system further includes a loading device removably attachable to the at least one load cell. The loading device is configured to move the loading sling in a load direction, perpendicular to the spreader bar of the loading sling. The loading device additionally includes a controller configured to receive output data from the first measuring device and the second measuring device and determine a freeplay value between the first measuring device and the second measuring device. When the first measuring device and the second measuring device are coupled to the first structure and the second structure, respectively, the spreader bar is positionable adjacent to a loading surface of the second structure so that the at least one loading pad applies a predetermined external load only to the loading surface of the second structure. The preceding subject matter of this paragraph characterizes example 17 of the present disclosure.

Further disclosed herein is a method of measuring freeplay between a first structure and a second structure of an object. The method includes latching a joint, defining a joint axis, between the first structure and the second structure of the object. The second structure is selectively movable, relative to the first structure when the joint is unlatched. The method also includes removably positioning a first measuring device on the first structure and a second measuring device on the second structure. The method further includes removably positioning a spreader bar of a loading sling adjacent to a loading surface of the second structure. The loading sling includes at least one loading pad coupled to and extending from the spreader bar and when the loading sling is positioned adjacent to the loading surface of the second structure the at least one loading pad is contacting a contact location on the loading surface of the second structure. The method additionally includes applying a predetermined external load to only the second structure, via the loading sling. The method also includes determining a freeplay value by comparing a first output value, measured by the first measuring device, to a second output value, measured by the second measuring device, when the predetermined external load is applied. The preceding subject matter of this paragraph characterizes example 18 of the present disclosure.

The step of applying a predetermined external load to only the second structure further comprises moving the loading sling in a load direction, perpendicular to the spreader bar of the loading sling, via a loading device. The preceding subject matter of this paragraph characterizes example 19 of the present disclosure, wherein example 19 also includes the subject matter according to example 18, above.

The step of removably positioning the spreader bar of the loading sling further comprises positioning the loading sling, relative to the object, such that only the second structure passes through an aperture defined by the loading sling. The preceding subject matter of this paragraph characterizes example 20 of the present disclosure, wherein example 20 also includes the subject matter according to any of examples 18-19, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Figure 1:
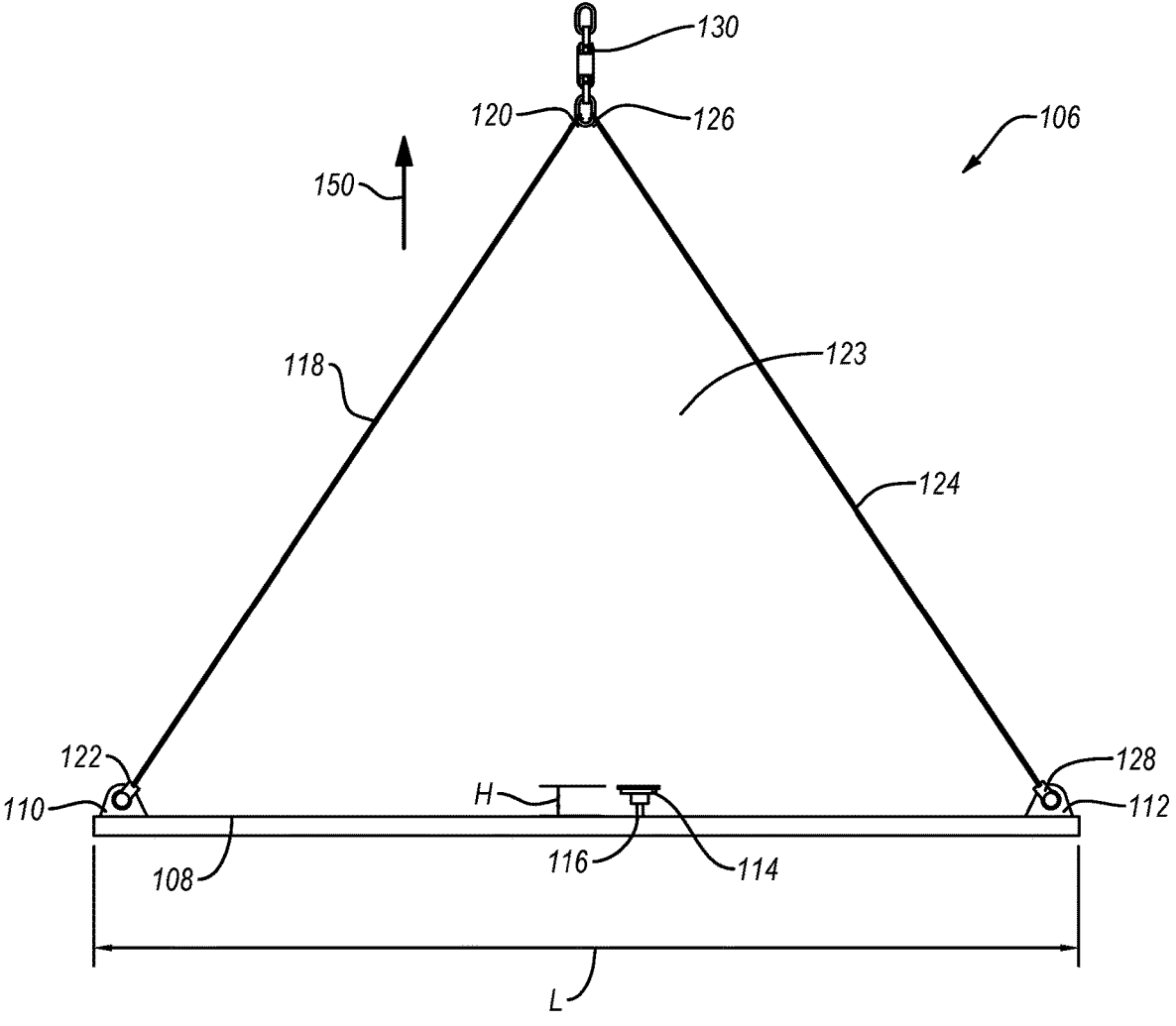
FIG. 1 is a schematic perspective view of a loading sling and a load cell of a freeplay measurement tool, according to one or more examples of the present disclosure.

Reference throughout this specification to "one example," "an example," or similar language means that a particular feature, structure, or characteristic described in connection with the example is included in at least one example of the subject matter of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the subject matter of the present disclosure, however, absent an express correlation to indicate otherwise, an implementation may be associated with one or more examples.

Disclosed herein are examples of a freeplay measurement tool, and associated systems and methods, for measuring freeplay. The following provides some features of at least some examples of the freeplay measurement tool. The freeplay measurement tool includes a loading sling, removably attachable to at least one load cell, and two measuring devices. The loading sling, together with the load cell(s), is suspendable from an object, such as a crane or other suspendable location, and is removably positionable, relative to a structure (i.e., moveable part), to apply an external load to the structure. After the loading sling is positioned, relative to the structure and applying an external load, the two measuring devices work in coordination to determine a freeplay value in a joint between the two structures.

In some industries, it is desirable or necessary to measure freeplay in a joint of an object at specific time intervals, such as annually, daily, or before each use of the object. For example, in the aircraft industry, measuring freeplay in critical locations of the aircraft, including control surfaces for directional control during flight and, in some cases, folding wingtips, is mandatory to ensure safe operation of the aircraft. Folding wingtips have been used in both military and commercial aircraft, enabling the utilization of wings with large spans that, after landing, can be reduced to allow the aircraft to maneuver in smaller areas. Some organization, such as the FAA or an aircraft manufacturer, may require that folding wingtips on aircraft be tested for freeplay at specific times and under a minimum external load. For example, folding wingtips may need to be testing every three years under a minimum external load of 1200 lbs+/−5 percent. The resulting freeplay value may be required to be less than a predetermined value to ensure the continued safe operation of the aircraft. Conventional freeplay testing methods, using ground-supported tools, which directly apply a load to a movable structure, are difficult or impossible to use for testing folding wingtips due to the height of the folding wingtips. Moreover, the minimum external load required for testing folding wingtips is much greater than other locations on an aircraft, often exceeding an order of magnitude (i.e., 100-300 lbs. vs. 1200 lbs.), which is challenging with conventional freeplay testing methods. By suspending the loading sling from an object, either above or to a side of the structure to be testing, the freeplay measurement tool does not rely on ground-supported tools to apply the external load. Moreover, the loading sling is also capable of applying large amounts of external load.

Referring to FIG. 1, one example of a loading sling 106 is shown. The loading sling 106 includes a spreader bar 108 with a forward end 110 and an aft end 112, that is spaced apart from the forward end 110 by a bar length L. In some examples, the spreader bar 108 is a linear bar that is configured to be positioned adjacent to a loading surface of a structure (see, e.g., FIG. 4) during use. In other examples, the spreader bar 108 is a nonlinear bar, such as a bar having a curved or bent profile, and may mirror or partially mirror the shape of the loading surface of the structure to which the spreader bar 108 is configured to be positionable adjacent. The spreader bar 108 is formed from a rigid material such as steel, aluminum, other strong metal, wood, or impact resistant plastic, etc.

The loading sling 106 includes a first retention member 118, having a first upper end 120 and a first lower end 122. The first retention member 118 is fixed to the forward end 110 of the spreader bar 108 at the first lower end 122. The loading sling 106 also includes a second retention member 124, having a second upper end 126 and a second lower end 128. The second retention member 124 is fixed to the aft end 112 of the spreader bar 108 at the second lower end 128. The first retention member 118 and the second retention member 124 may be made of a strong and flexible material, such as a cable, chain, or rope. Alternatively, in other examples, the retention members may be made of a strong and nonflexible material, such as a metal rod. The first retention member 118 and the second retention member 124 have the same length, which allows the spreader bar 108 to move at equal rates in a load direction 150 at both the forward end 110 and the aft end 112. In some examples, the length of the first retention member 118 and/or the second retention member 124 is adjustable, via a turnbuckle attached to the corresponding retention member, to equalize the movement rate between the forward end 110 and the aft end 112. Accordingly, the loading sling 106 is movable in the load direction 150 to apply an external load to a loading surface of a structure. In some examples, the load direction 150 is perpendicular to the spreader bar 108 of the loading sling 106, such was when the spreader bar 108 is linear. In other examples, such as when the spreader bar 108 is nonlinear, the load direction 150 is perpendicular to a plane extending from the forward end 110 to the aft end 112 of the spreader bar 108.

Figure 5:
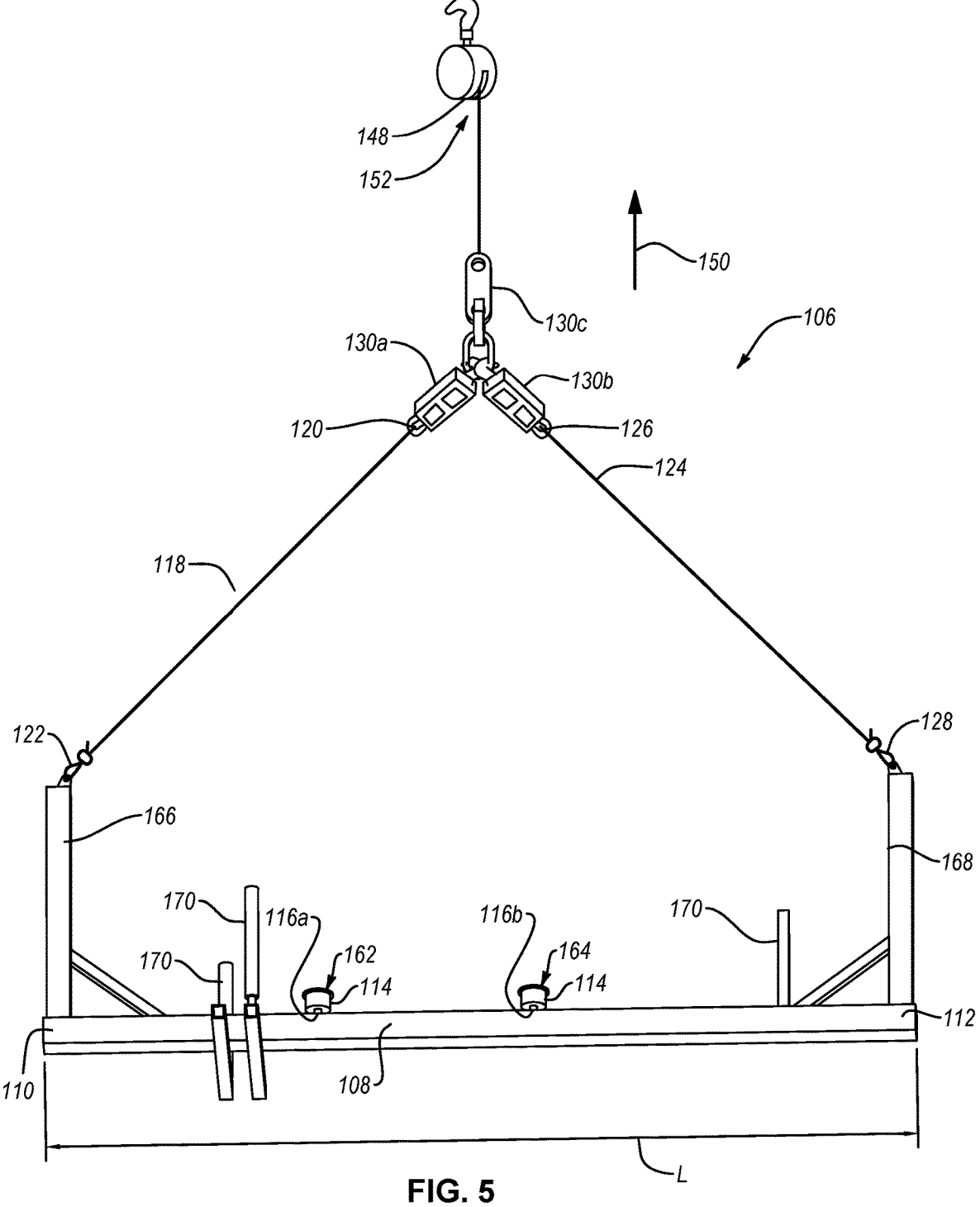
FIG. 5 is a schematic perspective view of a loading sling attached to a plurality of load cells and a loading device attached to one of the plurality of load cells, according to one or more examples of the present disclosure.

The loading sling 106 is removably attachable to at least one load cell 130. As used herein, a load cell is a sensor used to measure force or weight by converting a force into an electrical signal that can be measured. That is, when the loading sling 106 is attached to the at least one load cell 130 and applying an external load to a structure, the at least one load cell 130 measures the amount of external load that is being applied to the structure. The first upper end 120 of the first retention member 118 and the second upper end 126 of the second retention member 124 are removably attachable to at least one load cell 130. In some examples, the first retention member 118 and second retention member 124 are attachable to one load cell 130, as shown in FIG. 1. The load cell 130 therefore measures the full force applied by the loading sling 106. In other examples, the loading sling 106 is attachable to multiple load cells. For example, as shown in FIG. 5, the first retention member 118 is attached a first load cell 130a, which measures the force applied at the first retention member 118, and the second retention member 124 is attached to a second load cell 130b, which measures the force applied at the second retention member 124. A third load cell 130c is attached to both the first load cell 130a and the second load cell 130b and measures the full force applied by loading sling 106. Multiple load cells 130 may be utilized to ensure that the force is applied equally at the forward end 110 and the aft end 112 of the spreader bar 108. In some examples, if an unequal load distribution to the spreader bar 108 is desired, the multiple load cells 130 may be used to measure the unequal load distribution. When the loading sling 106 is attached to the at least one load cell 130, the first retention member 118, the spreader bar 108, and the second retention member 124, define an aperture 123.

The loading sling 106 also includes at least one loading pad 114, which is coupled to and extends from the spreader bar 108 at a loading position 116 along the bar length L. The loading position 116 of the at least one loading pad 114 may be at any position along the bar length L between the forward end 110 and the aft end 112. In some cases, the loading pad 114 is centered between the forward end 110 and the aft end 112 of the spreader bar 108. The at least one loading pad 114 extends from the spreader bar 108 at a height H, such that when the spreader bar 108 is positioned adjacent to a structure, only the at least one loading pad 114 contacts the structure. The at least one loading pad 114, in some examples, is fixed to the spreader bar 108, such that the height H, angle, and the loading position 116 are not adjustable, relative to the spreader bar 108. The fixed nature of the at least one loading pad 114 can be useful to prevent possible misalignment or incorrect load application with the structure to be tested. However, in other examples, such as a loading sling 106 that is used to test multiple different structures, the at least one loading pad 114 may be adjustably fixed to the spreader bar 108. At least one of the height H, angle, or the loading positioning 116 of the at least one loading pad 114, relative to the spreader bar 108, may be adjustable.

Figure 2:
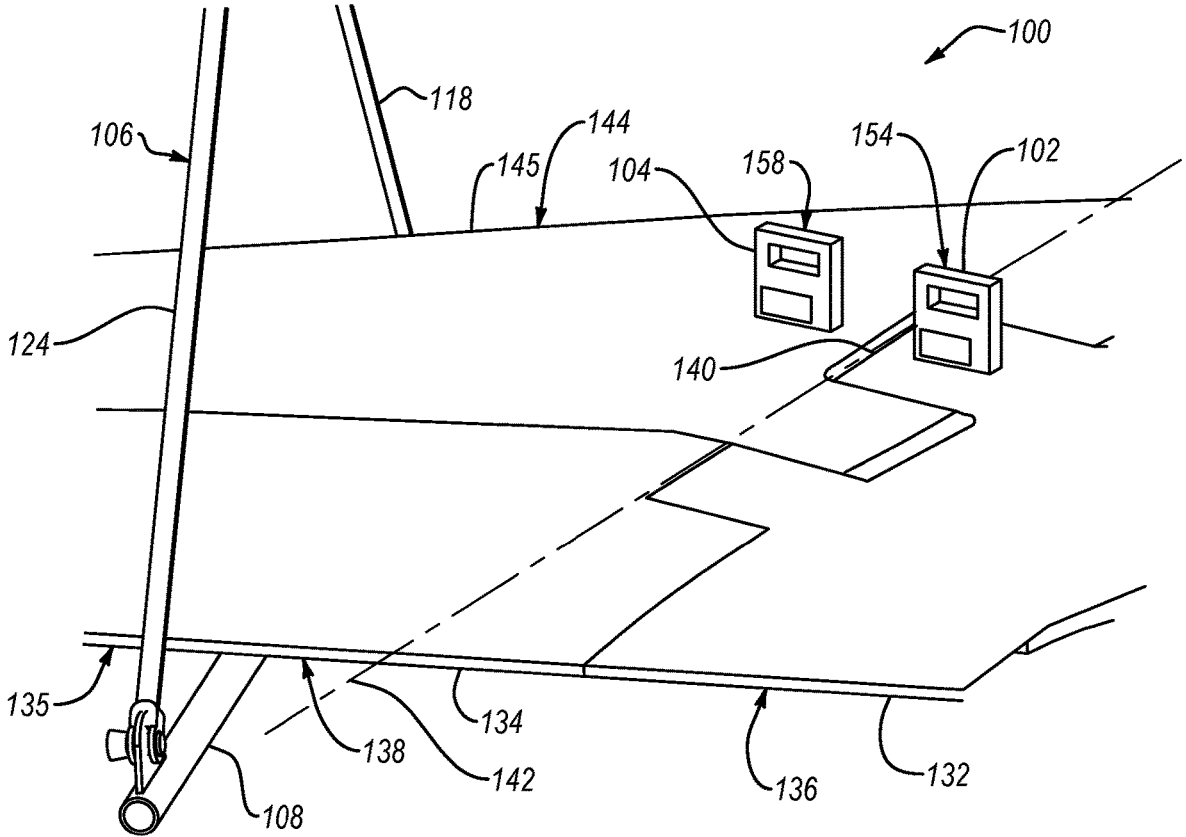
FIG. 2 is a schematic perspective view of a freeplay measurement tool with a first measuring device on a first structure, a second measuring device on a second structure, and a spreader bar of a loading sling adjacent to the second surface, according to one or more examples of the present disclosure.

Referring to FIG. 2, a freeplay measurement tool 100, having a first measuring device 102 and a second measuring device 104 is shown. The first measuring device 102 and the second measuring device 104 cooperatively measure freeplay between two structures of an object 145. The first measuring device 102 is configured to be removably coupled to a first structure 132 of the object 145 and the second measuring device 104 is configured to be removably coupled to a second structure 134 of the object 145. In some cases, the first measuring device 102 and the second measuring device 104 are placed directly on the first structure 132 and the second structure 134, respectively, with or without coupling features. In other cases, a rubber pad or other grip-supporting article can be used between the first measuring device 102 and the first structure 132 and between the second measuring device 104 and the second structure 134 in order to keep the first measuring device 102 and the second measuring device 104 in place during the freeplay measuring testing. The first structure 132 is non-movable and connected to the second structure 134, which is selectively movable relative to the first structure 132, via a joint 140, defining a joint axis 142. The joint 140 allows the second structure 134 to move in one or more degrees of freedom, such as moving linearly or rotating, relative to the first structure 132. In some examples, the joint 140 only allows the second structure 134 to be selectively rotatable in one direction about the joint axis 142. In other words, the second structure 134 is limited to movement in one degree of freedom. In some examples, the first structure 132 is a fixed wing root 136 of a wing 144 of an aircraft and the second structure 134 is a folding wingtip 138 of the wing 144 of the aircraft, with the folding wingtip 138 capable of rotatable movement inwardly, in a direction toward a fuse-lage of the aircraft.

During a freeplay measuring test, when the first measuring device 102 is on the first structure 132 and the second measuring device 104 is on the second structure 134, the first measuring device 102 is configured to determine a first output value and the second measuring device 104 is con-figured to determine a second output value. Using the first output value and the second output value, a freeplay value, defining freeplay in the joint, can be determined. In some examples, the first measuring device 102 is a first inclinom-eter 154 and the second measuring device 104 is a second inclinometer 158 configured to cooperatively measure a differential angular deflection between the first structure 132 and the second structure 134. That is, the first output value and the second output value are angular measurements that are used to determine the differential angular deflection between the first structure 132 and the second structure 134. In other examples, the first measuring device 102 and the second measuring device 104 are configured to coopera-tively measure a linear distance between the first structure 132 and the second structure 134. Additionally, during the freeplay measuring test, the spreader bar 108 of the loading sling 106 is positioned adjacent to a loading surface 135 of the second structure 134, and when the first measuring device 102 and the second measuring device 104 are coupled to the first structure 132 and the second structure 134, respectively, the loading sling 106 is configured to apply an external load only to the loading surface 135 of the second structure 134.

Figure 3:
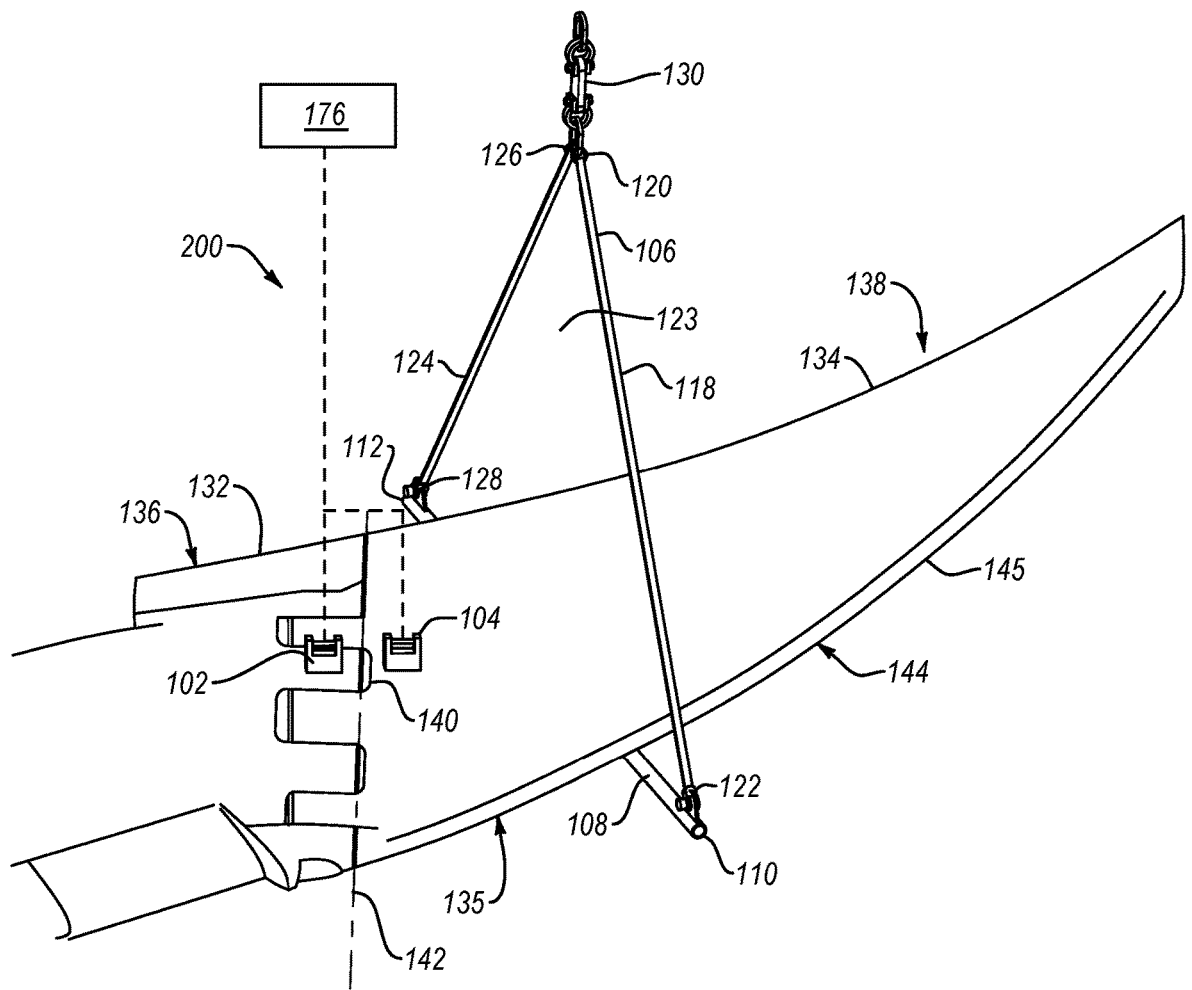
FIG. 3 is a schematic perspective view of a freeplay measurement system, with a freeplay measurement tool positioned on an object and a controller, according to one or more examples of the present disclosure.

A freeplay measurement system 200 for measuring free-play between a first structure 132 and a second structure 134 is shown on a wing 144 in FIG. 3. The freeplay measurement system 200 is measuring freeplay in the joint 140, defined by the joint axis 142 between the fixed wing root 136 and the folding wingtip 138 of a wing 144. However, as should be understood by one skilled in the art, the freeplay measure-ment system 200 can be used to measure freeplay in any of a variety of objects 145 having a joint 140 between a first structure 132 and a second structure 134 including, without limitation, control surfaces on the aircraft such as a rudder, an aileron, a flap, and an elevator. The loading sling 106 is positioned adjacent to the loading surface 135 of the second structure 134, or folding wingtip 138. That is, the loading sling 106 is positionable on the movable structure of the joint 140 to apply an external load to the movable structure, and only to the movable structure, as the external load is not applied to the first structure 132 that is non-movable. To position the loading sling 106 on the second structure 134, the loading sling 106 is passed through the aperture 123, defined by the loading sling 106. Specifically, the aperture 123 is defined by the first retention member 118, the second retention member 124 and the spreader bar 108 of the loading sling 106. That is, only the second structure 134 is passed through the aperture 123 and the loading sling 106 is positioned on the second structure-side of the joint axis 142. The loading surface 135 of the second structure 134 has a surface length L2 (see, e.g., FIG. 4). The surface length L2 of the loading surface 135 is less than the bar length L of the spreader bar 108, such that the second structure 134 can pass within the aperture 123 without contacting the first retention member 118 and the second retention member 124.

Additionally, the first measuring device 102 and the second measuring device 104 are coupled to the first struc-ture 132 and the second structure 134, respectively, either before or after the loading sling 106 is placed in position on the second structure 134. Once the first measuring device 102 and the second measuring device 104 are properly coupled to the object 145, and the loading sling 106 is positioned and applying an external load to the second structure 134, the first measuring device 102 and the second measuring device 104 can measure freeplay in the joint 140. In some examples, a manual reading of the first output value from the first measuring device 102 and the second output value from the second measuring device 104 can be taken. In other examples, a controller 176 is configured to receive the output data from the first measuring device 102 and the second measuring device 104. The controller 176 is in electrical communication, wired or wireless, with the first measuring device 102 and the second measuring device 104 and is configured to determine a freeplay value in the joint between the first structure 132 and the second structure 134.

Figure 4:
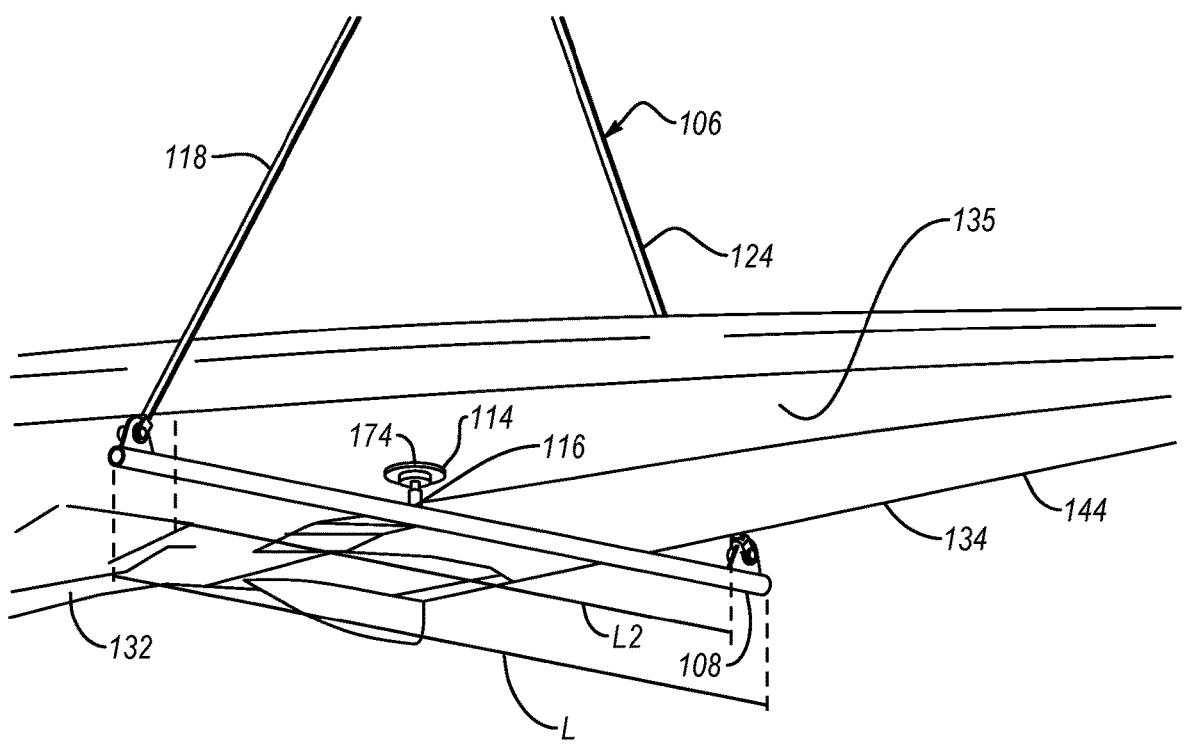
FIG. 4 is a schematic perspective view of the loading sling of FIG. 3, with the loading pad contacting the second structure, according to one or more examples of the present disclosure.

As shown in FIG. 4, the spreader bar 108 is positionable adjacent to the loading surface 135 of the second structure 134. Loading surface, as used herein, refers to the surface of the structure that is intended to bear the external load applied during testing. The loading surface is opposite of a joint surface of the second structure, which refers to the surface directly connected to the joint, around which the second structure 134 rotates. When positioned, the at least one loading pad 114 applies a predetermined external load only to the loading surface 135 of the second structure 134. In some examples, the loading surface 135 is a bottom surface (i.e., ground-facing surface), such as the loading surface 135 of the folding wingtip shown. However, the loading surface 135 can, in other examples, be a surface other than a bottom surface, such as a side-surface of top-surface. For example, when the loading sling 106 is measuring freeplay in an object 145 with a joint axis that is perpendicular to the ground, the spreader bar 108 is positioned adjacent to the loading surface (i.e., side surface) and the load direction 150 is parallel to the ground. That is, the loading sling 106 will have a sideways orientation (e.g., horizontal), rather than an upright orientation (e.g., vertical), as shown.

The at least one loading pad 114 is configured to contact a contact location 174 on the loading surface 135. In some examples, where the at least one loading pad 114 is not adjustable, the loading sling 106 is adjusted until the loading position 116 of the at least one loading pad 114 is directly aligned with the contact location 174 before the at least one loading pad 114 contacts the contact location 174 and the loading sling 106 is securely positioned on the second structure 134. In other examples, where the at least one loading pad 114 is adjustable in at least one of the height H, angle, or the loading position 116 of the loading pad 114, the loading pad 114 is positioned adjacent to the second struc-ture 134 and the at least one loading pad 114 is adjusted to directly align the loading position 116 with the contact location 174 before the at least one loading pad 114 contacts the contact location 174 and the loading sling 106 is securely positioned on the second structure 134.

The at least one loading pad 114 has a surface area that contacts the contact location 174. The surface area, as shown in FIG. 4, is circular, however, the surface area can have any shape including geometric or nongeometric shapes, etc. Moreover, the at least one loading pad 114 is the only portion of the loading sling 106 that contacts the second structure 134. That is, the external load is applied exclu-sively at the contact location 174. As such, the contact location 174 has sufficient structural support to withstand the external load. In some examples, the predetermined external load is at least 100 lbs+/−5 percent. In other examples, the predetermined external load is at least 1200 lbs+/−5 percent. Therefore, the contact location 174, or multiple contact locations 174, if the loading sling 106 has multiple loading pads 114, needs to withstand the predetermined external load applied.

Referring to FIG. 5, a loading device 148 is removably attachable to the at least one load cell 130. As used herein, a loading device 148 is any device used to lift another object. The loading device 148, in some examples, is a chain hoist 152 which is removably attachable to the at least one load cell 130. The chain hoist 152 may be a manual chain hoist, such as a manual chain hoist operated by a hand crank, an electric chain hoist, or a pneumatic chain hoist. When attached to the at least one load cell 130, the loading device 148, is configured to move the loading sling 106 in the load direction 150, perpendicular to the forward end 110 and the aft end 112 of the spreader bar 108. The loading device 148 is attached to an object which can suspend the loading sling 106, such as a crane, an elevator lift, or other suspension object.

In some examples, the spreader bar 108 includes a first extension arm 166 at the forward end 110 of the spreader bar 108. The first extension arm 166 may be perpendicular to the bar length L of the spreader bar 108. In this case, rather than being fixed directly to the forward end 110 of the spreader bar 108, the first lower end 122 of the first retention member 118 is fixed to a top end, opposite of the forward end 110, of the first extension arm 166. Likewise, the spreader bar 108 also includes a second extension arm 168 at the aft end 112 of the spreader bar 108. The second extension arm 168 may be perpendicular to the bar length L of the spreader bar 108. Rather than being fixed directly to the aft end 112 of the spreader bar 108, the second lower end 128 of the second retention member 124 is fixed to a top end, opposite of the aft end 112, of the second extension arm 168. The first extension arm 166 and the second extension arm 168 are formed of a non-flexible material and may be formed from the same material as the bar length L of the spreader bar 108, such as steel, aluminum, other rigid metal, impact resistant plastic, or wood. The first extension arm 166 and the second extension arm 168 are fixed to the forward end 110 and the aft end 112, respectively, by any means, such as welding or coupling features like screws or bolts. In some examples, the first extension arm 166, the bar length L of the spreader bar 108, and the second extension arm 168 have a one-piece, seamless monolithic construction. The first extension arm 166 and the second extension arm 168 allow the aperture 123 of the loading sling 106 to be larger than an aperture 123 of a loading sling without a first extension arm 166 and a second extension arm 168. In some cases, when the second structure 134 is passed through the aperture 123 of the loading sling, the second structure 134 is between the first extension arm 166 and the second extension arm 168 (see, e.g., FIG. 8) and may make it easier to properly position the loading sling 106, relative to the second structure 134. Additionally, the first extension arm 166 and the second extension arm 168, in some cases, adds stability to the loading sling 106.

In some examples, the spreader bar 108 includes guide poles 170 coupled to and extending from the spreader bar 108 at locations between the forward end 110 and the aft end 112 of the spreader bar 108. Multiple guide poles 170 may be coupled to the spreader bar 108 with a guide pole(s) adjacent to the forward end 110 and another guide pole(s)

170 adjacent to the aft end 112. The guide poles are configured to be adjacent to a side edge 172 of the second structure 134 when the spreader bar 108 is positioned adjacent to the loading surface 135 of the second structure 134. In some examples, the guide poles are configured to contact the side edge 172 of the second structure 134 when the spreader bar 108 is positioned adjacent to the loading surface 135 of the second structure 134. The guide poles may be used for a variety of purposes. For example, the guide poles 170 may be used to indicate that the spreader bar 108 is properly positioned adjacent to the second structure 134, such that when the guide poles 170 are adjacent to or contacting the side edge 172 of the second structure 134 when the loading position 116 of the loading pad 114 is aligned with the contact location 174 of the second structure 134. The guide poles 170, in another example, may be used to prevent the loading sling 106 from being positioned beyond the second structure 134, such that the guide poles 170 prevent the loading sling 106 from being improperly positioned at the joint 140 or on the first structure 132. Additionally, or alternatively, the guide poles 170 may be used to protect the second structure 134 from damage or harm from the loading sling 106. As the guide poles 170 may come in contact with the second structure 134, they are often formed from a material or covered by a material to prevent damage to the second structure 134, such as a foam material.

The spreader bar 108, in some examples, has a plurality of loading pads 114. As shown in FIG. 5, the spreader bar 108 has two loading pads 114 coupled to and extending from the spreader bar 108. A first loading pad 162 is coupled to the spreader bar 108 at a first loading position 116a and a second loading pad 164 is coupled to the spreader bar 108 at a second loading position 116b. The spreader bar 108 is positionable adjacent to the loading surface 135 of the second structure 134 so that the first loading pad 162 and the second loading pad 164 each apply the predetermined external load only to the loading surface 135 of the second structure 134. In other words, both the first loading pad 162 and the second loading pad 164 apply the predetermined external load to the second structure 134. In some examples, the predetermined external load is applied to the second structure 134 is equal proportions by the first loading pad 162 and the second loading pad 164. In other examples, the predetermined external load is applied to the second structure 134 in unequal proportions by the first loading pad 162 and the second loading pad 164, due to the shape of the loading surface 135 or the position of the loading device 148. Each of the plurality of loading pads 114, in some examples, may be adjustable to more easily align the loading position of each loading pad to a corresponding contact location 174 on the loading surface 135.

Figure 9:
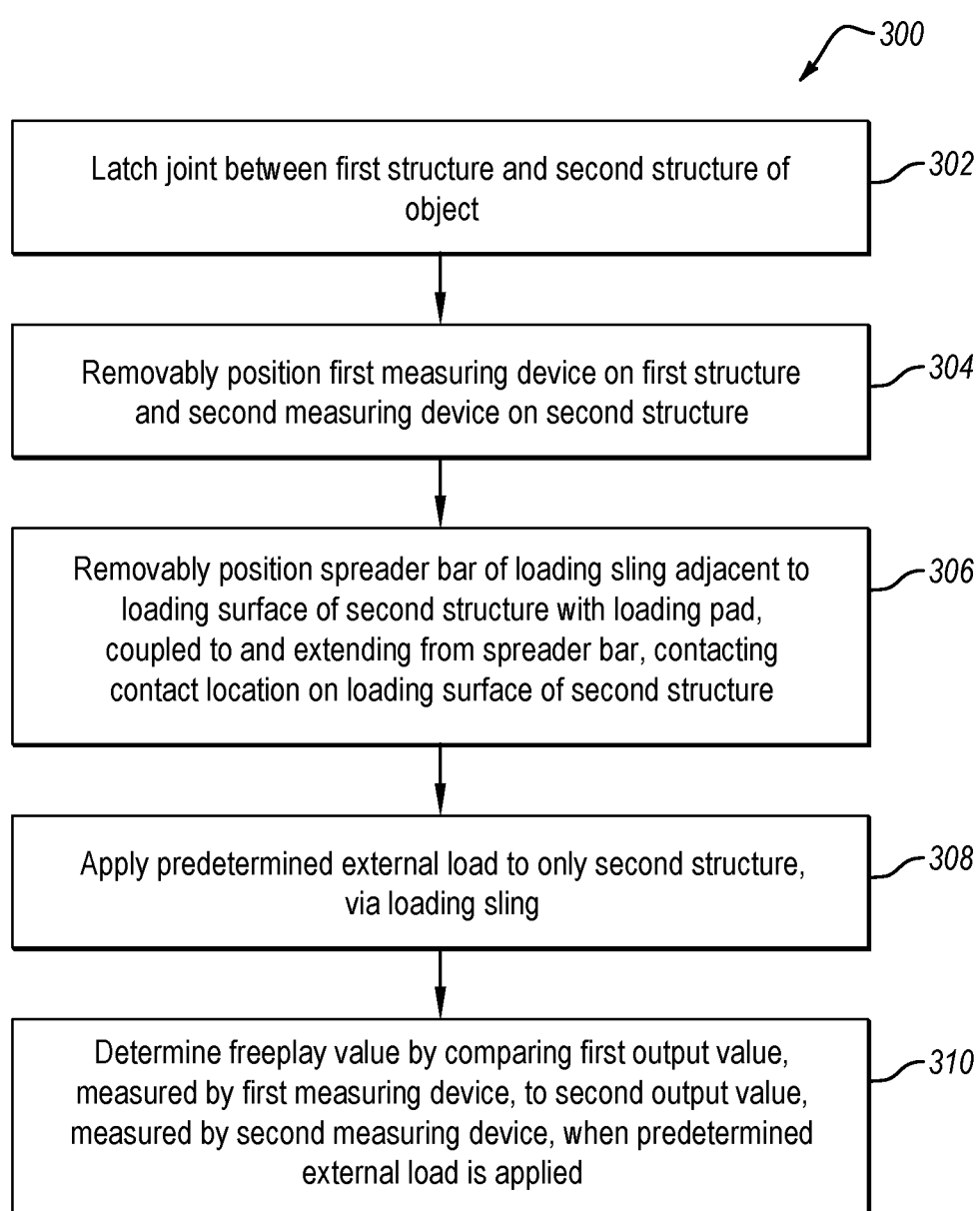
FIG. 9 is a schematic flow diagram of a method of measuring freeplay between a first structure and a second structure of an object, according to one of more examples of the present disclosure.

Referring to FIG. 9, according to some examples, a method 300 of measuring freeplay between a first structure 132 and a second structure 134 of an object 145 is shown. The method 300 includes (block 302) latching a joint 140, defining a joint axis 142, between the first structure 132 and the second structure 134 of the object 145. The second structure 134 being selectively movable, relative to the first structure 132, when the joint 140 is unlatched. For example, latching the joint 140 between the folding wingtip 138 of a wing 144, relative to the fixed wing root 136, such that the folding wingtip 138 is lengthened to its full span and fixed, relative to the fixed wing root 136. When latched, the joint 140 is not capable of movement, such as linear or rotational movement, and therefore, freeplay in the latched joint 140 can be measured.

Figure 6:
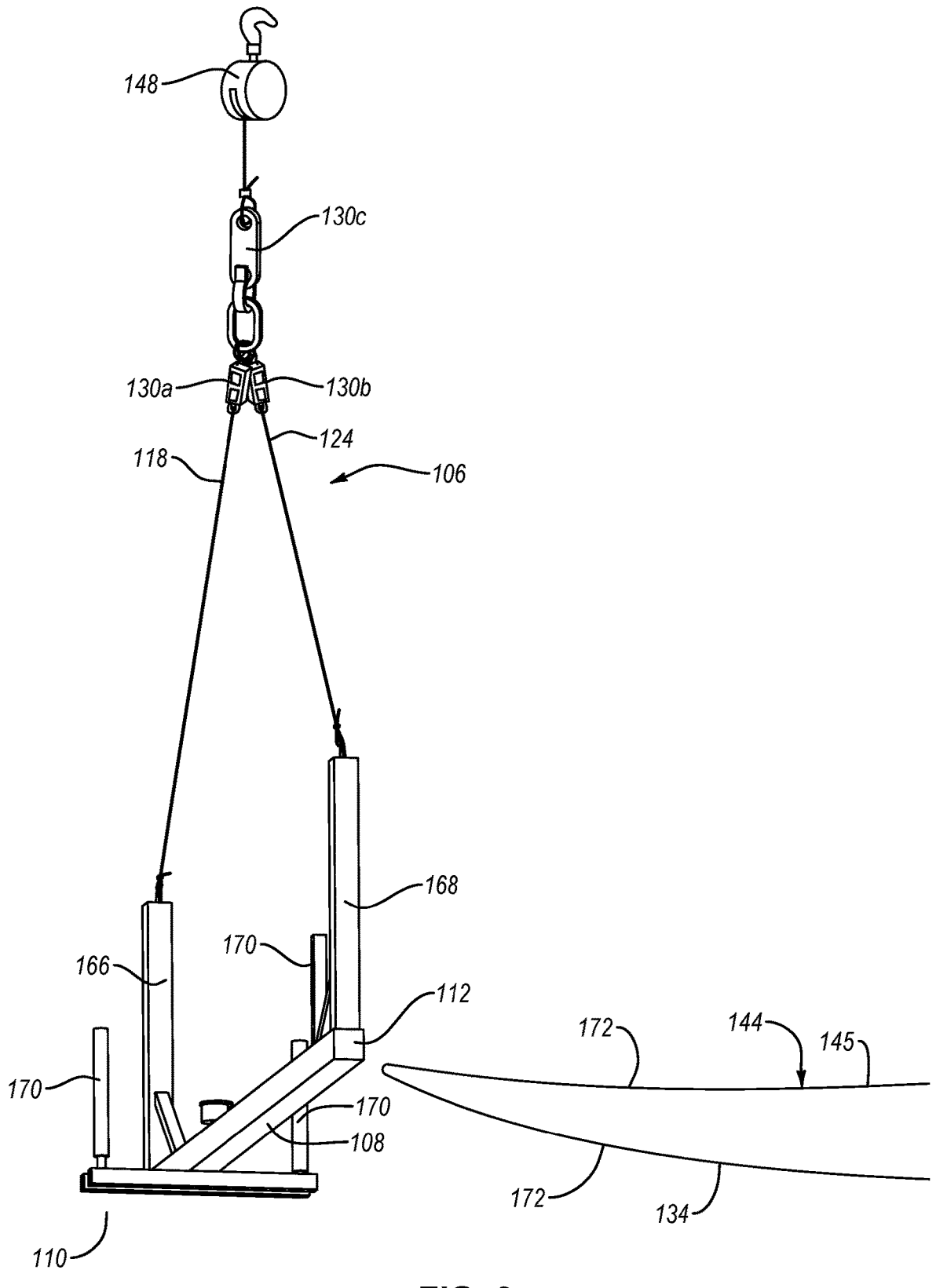
FIG. 6 is a schematic perspective view of a loading sling and a wing of an aircraft, prior to the loading sling being positioned on the wing, according to one or more examples of the present disclosure.

The method 300 also includes (block 304) removably positioning a first measuring device 102 on the first structure 132 and a second measuring device 104 on the second structure 134. The method 300 further includes (block 306) removably positioning a spreader bar 108 of a loading sling 106 adjacent to a loading surface 135 of the second structure 134. As shown in FIG. 6, the loading sling 106 is positioned, relative to the object 145, such that only the second structure 134 passes through an aperture 123 defined by the loading sling 106. As such, the loading sling 106 can only apply an external load to the second structure 134 of the object 145. The loading sling 106 is attached to the at least one load cell 130, which is attached to the loading device 148. In some examples, more than one load cell may be used, such as load cells 130a, 130b, and 130c. Moreover, the loading device 148 is coupled to a crane, or other suspending object, that lifts and moves the loading sling 106, relative to the second structure 134. The loading sling 106 includes at least one loading pad 114 coupled to and extending from the spreader bar 108, and when the loading sling 106 is positioned adjacent to the loading surface 135 of the second structure 134 the at least one loading pad 114 is contacting a contact location 174 on the loading surface 135 of the second structure 134. In some examples, the at least one loading pad 114 may be adjustable to adjust a height H, an angle, or a loading position 116 before the at least one loading pad 114 is in contact with the contact location 174. In some cases, these steps (block 304 and block 306) can also be performed in the reverse order such that the loading sling 106 is removably positioned prior to removably positioning the first measuring device 102 and the second measuring device 104.

Figure 7:
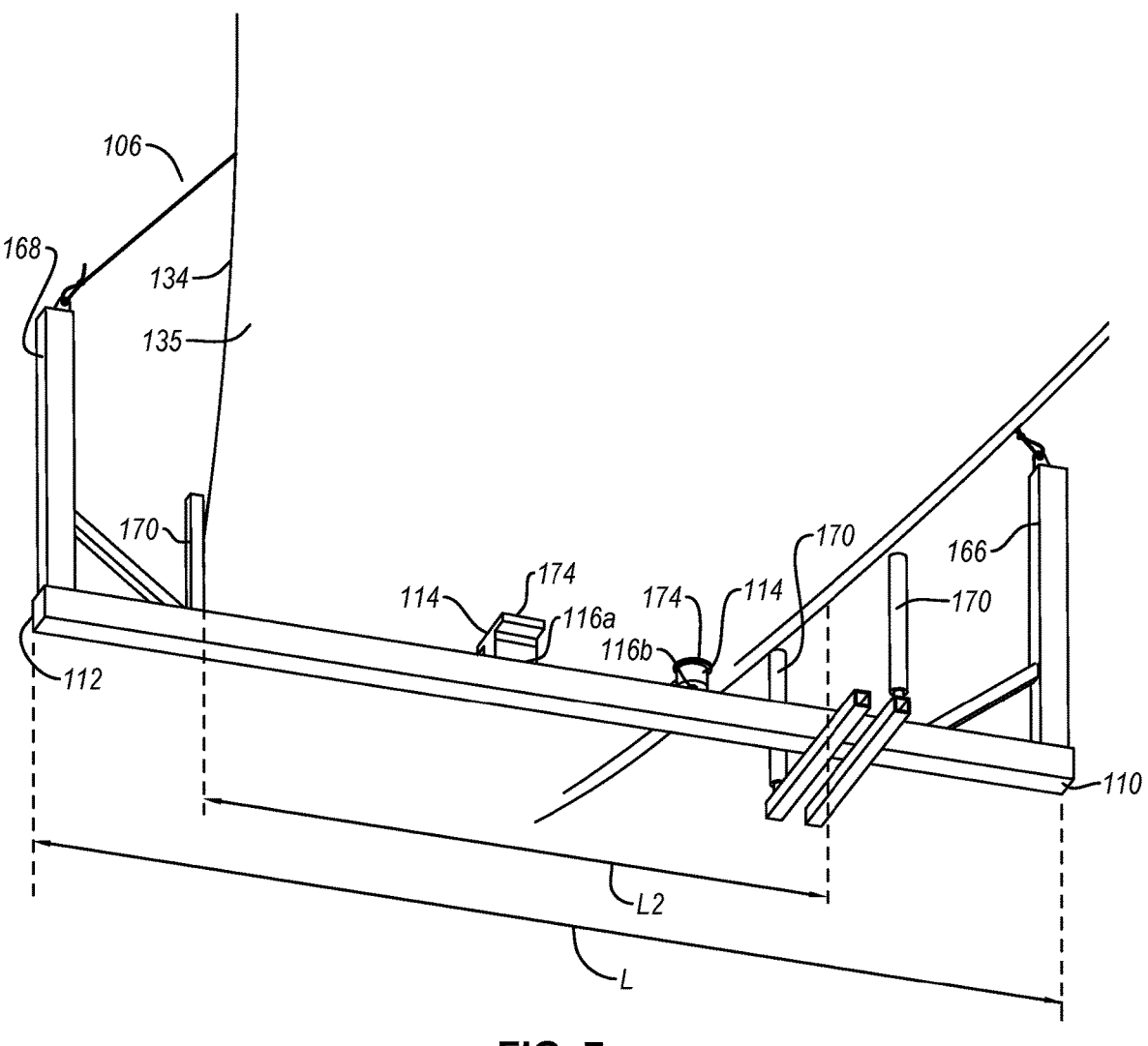
FIG. 7 is a schematic perspective view of the loading sling and the wing of the aircraft of FIG. 6, with the loading sling positioned on the second structure of the wing, according to one or more examples of the present disclosure.

The method 300 additionally includes (block 308) applying a predetermined external load to only the second structure 134, via the loading sling 106. As shown in FIG. 7, the spreader bar 108 of the loading sling 106 is positioned adjacent to a loading surface 135 of the second structure 134 so that the at least one loading pad 114 applies a predetermined external load only to the loading surface 135 of the second structure 134. The loading sling 106 is moved in a load direction 150, via the loading device 148, perpendicular to the forward end 110 and the aft end 112 of the spreader bar 108 of the loading sling 106 until the predetermined external load is reached. In some examples, the spreader bar 108 includes a plurality of loading pads 114, each at a corresponding loading position, such as 116a and 116b, and the predetermined external load is applied to the loading surface 135 by the plurality of loading pads 114.

Figure 8:
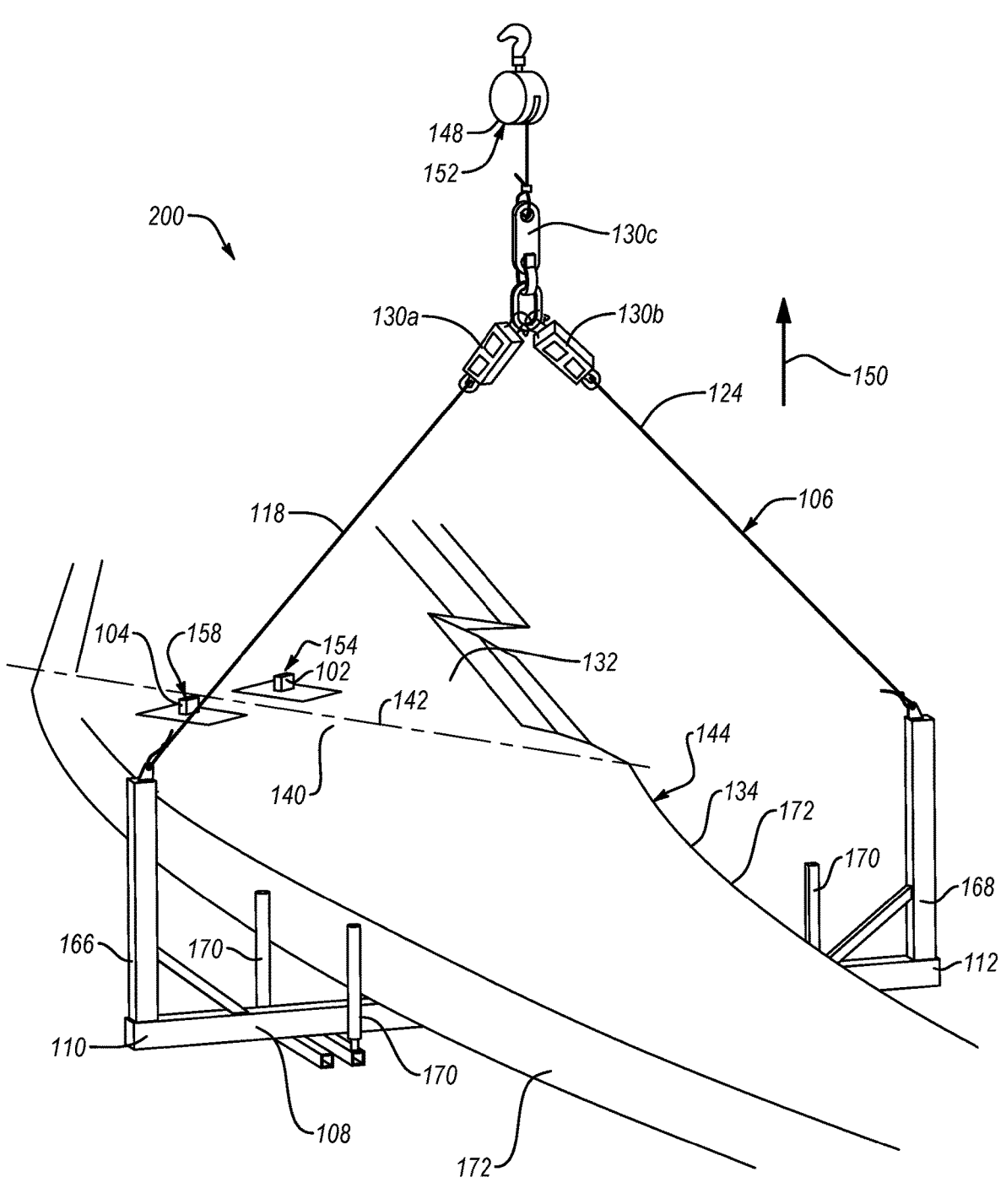
FIG. 8 is a schematic perspective view of the loading sling and the wing of the aircraft of FIG. 6, with the loading sling positioned on the second structure of the wing, and with a first measuring device and second measuring device positioned on the wing, according to one or more examples of the present disclosure.

The method 300 also includes (block 310) determining a freeplay value by comparing a first output value, measured by the first measuring device 102, to a second output value, measured by the second measuring device 104, when the predetermined external load is applied. As shown in FIG. 8, the first measuring device 102 is on the first structure 132 and the second measuring device 104 is on the second structure 134. Working cooperatively, the first measuring device 102 and the second measuring device 104 measure a freeplay value. In some examples, the first measuring device 102 is a first inclinometer 154 and the second measuring device 104 is a second inclinometer 158 which determine a freeplay value measured by the differential angular deflection between the first structure 132 and the second structure 134. The freeplay value may be read manually or a controller may be in communication with the first measuring device 102 and the second measuring device 104 to determine the freeplay value.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the examples herein are to be embraced within their scope.

What is claimed is:

1. A freeplay measurement tool, comprising:
a first measuring device configured to be removably coupled to a first structure;
a second measuring device configured to be removably coupled to a second structure, wherein the first structure and the second structure are connected via a joint, defining a joint axis, and the second structure is selectively movable, relative to the first structure, about the joint axis;
at least one load cell; and
a loading sling comprising:
a spreader bar comprising a forward end and an aft end, wherein the forward end is spaced apart from the aft end by a bar length;
at least one loading pad coupled to and extending from the spreader bar at a loading position along the bar length;
a first retention member comprising a first upper end and a first lower end, wherein the first upper end is removably attachable to the at least one load cell and the first lower end is fixed to the forward end of the spreader bar; and
a second retention member comprising a second upper end and a second lower end, wherein the second upper end is removably attachable to the at least one load cell and the second lower end is fixed to the aft end of the spreader bar;
wherein, when the first measuring device and the second measuring device are coupled to the first structure and the second structure, respectively, the spreader bar is positionable adjacent to a loading surface of the second structure so that the at least one loading pad applies a predetermined external load only to the loading surface of the second structure.

2. The freeplay measurement tool of claim 1, wherein the first measuring device and the second measuring device are inclinometers configured to cooperatively measure a differential angular deflection between the first structure and the second structure.

3. The freeplay measurement tool of claim 1, wherein the first structure is a fixed wing root of a wing of an aircraft and the second structure is a folding wing tip of the wing of the aircraft.

4. The freeplay measurement tool of claim 1, further comprising a loading device configured to be removably attachable to the at least one load cell, wherein the loading device is configured to move the loading sling in a load direction perpendicular to the spreader bar of the loading sling.

5. The freeplay measurement tool of claim 4, wherein the loading device is a chain hoist.

6. The freeplay measurement tool of claim 1, wherein at least one of a height, an angle, or the loading position of the at least one loading pad, relative to the spreader bar, is adjustable.

7. The freeplay measurement tool of claim 1, wherein the loading sling comprises a plurality of loading pads, the at least one loading pad being at least one of the plurality of loading pads.

8. The freeplay measurement tool of claim 7, wherein:
the plurality of loading pads comprises a first loading pad and a second loading pad;
the spreader bar is positionable adjacent to the loading surface of the second structure so that the first loading pad and the second loading pad apply the predetermined external load only to the loading surface of the second structure; and
the predetermined external load is applied to the second structure by the first loading pad and the second loading pad.

9. The freeplay measurement tool of claim 1, further comprising a plurality of load cells, wherein the at least one load cell comprises at least one of the plurality of load cells.

10. The freeplay measurement tool of claim 1, wherein the spreader bar further comprises:
a first extension arm at the forward end, the first extension arm being perpendicular to the bar length of the spreader bar, wherein the first lower end of the first retention member is fixed to the first extension arm; and
a second extension arm at the aft end, the second extension arm being perpendicular to the bar length of the spreader bar, wherein the second lower end of the second retention member is fixed to the second extension arm.

11. The freeplay measurement tool of claim 1, wherein:
the loading sling further comprises guide poles coupled to and extending from the spreader bar at locations between the forward end and the aft end of the spreader bar; and
the guide poles adjacent to a side edge of the second structure when the spreader bar is positioned adjacent to the loading surface of the second structure so that the at least one loading pad applies the predetermined external load only to the loading surface of the second structure.

12. The freeplay measurement tool of claim 1, wherein:
the loading surface of the second structure had a surface length; and
the bar length of the spreader bar is greater than the surface length of the loading surface.

13. The freeplay measurement tool of claim 1, wherein the joint axis has only one degree of freedom, such that the second structure is selectively rotatable, relative to the first structure, about the joint axis.

14. The freeplay measurement tool of claim 1, wherein:
the at least one loading pad is configured to contact a contact location on the second structure; and
the contact location has sufficient structural support to withstand the predetermined external load.

15. The freeplay measurement tool of claim 4, wherein:
the predetermined external load is at least 1200 lbs+/−5 percent; and
the loading device is configured to move the loading sling in the load direction, perpendicular to the spreader bar of the loading sling, until the predetermined external load is applied to the second structure.

16. The freeplay measurement tool of claim 1, wherein:
an aperture is defined by the loading sling; and
the second structure is configured to pass through the aperture when the spreader bar of the loading sling is positioned adjacent to the loading surface of the second structure.

17. A freeplay measurement system comprising:
a first measuring device configured to be removably coupled to a first structure;
a second measuring device configured to be removably coupled to a second structure, wherein the first structure and the second structure are connected via a joint, defining a joint axis, and the second structure is selectively movable, relative to the first structure, about the joint axis;
at least one load cell;
a loading sling comprising:
a spreader bar comprising a forward end and an aft end, wherein the forward end is spaced apart from the aft end by a bar length;
at least one loading pad coupled to and extending from the spreader bar at a loading position along the bar length;
a first retention member comprising a first upper end and a first lower end, wherein the first upper end is removably attachable to the at least one load cell and the first lower end is fixed to the forward end of the spreader bar; and
a second retention member comprising a second upper end and a second lower end, wherein the second upper end is removably attachable to the at least one load cell and the second lower end is fixed to the aft end of the spreader bar;
a loading device removably attachable to the at least one load cell, wherein the loading device is configured to move the loading sling in a load direction, perpendicular to the spreader bar of the loading sling; and
a controller configured to receive output data from the first measuring device and the second measuring device and determine a freeplay value between the first measuring device and the second measuring device;
wherein, when the first measuring device and the second measuring device are coupled to the first structure and the second structure, respectively, the spreader bar is positionable adjacent to a loading surface of the second structure so that the at least one loading pad applies a predetermined external load only to the loading surface of the second structure.

18. A method of measuring freeplay between a first structure and a second structure of an object, the method comprising:
latching a joint, defining a joint axis, between the first structure and the second structure of the object, wherein the second structure is selectively movable, relative to the first structure, when the joint is unlatched;
removably positioning a first measuring device on the first structure and a second measuring device on the second structure;
removably positioning a spreader bar of a loading sling adjacent to a loading surface of the second structure, wherein the loading sling comprises at least one loading pad coupled to and extending from the spreader bar and when the loading sling is positioned adjacent to the loading surface of the second structure the at least one loading pad is contacting a contact location on the loading surface of the second structure;
applying a predetermined external load to only the second structure, via the loading sling; and
determining a freeplay value by comparing a first output value, measured by the first measuring device, to a second output value, measured by the second measuring device, when the predetermined external load is applied.

19. The method of claim 18, wherein the step of applying the predetermined external load to only the second structure further comprises moving the loading sling in a load direction, perpendicular to the spreader bar of the loading sling, via a loading device.

20. The method of claim 18, wherein the step of removably positioning the spreader bar of the loading sling further comprises positioning the loading sling, relative to the object, such that only the second structure passes through an aperture defined by the loading sling.

* * * * *